(12) United States Patent
Breda

(10) Patent No.: US 10,119,621 B2
(45) Date of Patent: Nov. 6, 2018

(54) VALVE HAVING A DIVERTING CARTRIDGE WITH INTEGRAL PRESSURE BALANCE

(71) Applicant: Silvano Breda, Vaughn (CA)

(72) Inventor: Silvano Breda, Vaughn (CA)

( * ) Notice: Subject to any disclaimer, the term of this patent is extended or adjusted under 35 U.S.C. 154(b) by 0 days.

(21) Appl. No.: 15/421,782

(22) Filed: Feb. 1, 2017

(65) Prior Publication Data

US 2018/0216740 A1    Aug. 2, 2018

(51) Int. Cl.
  *F16K 11/085* (2006.01)
  *F16K 31/60* (2006.01)
  *E03C 1/02* (2006.01)

(52) U.S. Cl.
  CPC .......... *F16K 11/0856* (2013.01); *E03C 1/023* (2013.01); *F16K 31/602* (2013.01); *Y10T 137/612* (2015.04)

(58) Field of Classification Search
  CPC .... F16K 11/0856; F16K 31/602; E03C 1/023; Y10T 137/6014
  See application file for complete search history.

(56) References Cited

U.S. PATENT DOCUMENTS

| | | | | |
|---|---|---|---|---|
| 3,103,231 A * | 9/1963 | Moen | | E03C 1/023 137/454.2 |
| 4,979,530 A * | 12/1990 | Breda | | F16K 11/0856 137/100 |
| 5,275,195 A * | 1/1994 | Breda | | F16K 11/078 137/100 |
| 6,196,266 B1 * | 3/2001 | Breda | | F16K 11/0853 137/454.6 |
| 6,832,396 B1 * | 12/2004 | Lin | | E03C 1/023 137/270 |
| 6,877,523 B2 * | 4/2005 | Dempsey | | F16K 11/076 137/597 |
| 7,165,570 B1 * | 1/2007 | Lordahl | | F16K 11/078 137/454.6 |

* cited by examiner

*Primary Examiner* — Craig Schneider
*Assistant Examiner* — Kevin Barss
(74) *Attorney, Agent, or Firm* — Nasser Ashgriz; UIPatent Inc.

(57) ABSTRACT

A valve having a diverting cartridge with an integral pressure balance for tubs, spouts and shower heads comprising of a housing having an opening to receive a cartridge, wherein the housing has a cold water inlet, a hot water inlet, and a shower outlet and a spout outlet. The cartridge has a cylindrical body with a plurality of cold water inlet apertures, a plurality of hot water inlet apertures and an outlet aperture designed on the cylindrical body. The hot and cold water inlet apertures of the cartridge are in alignment with the inlets of the housing for allowing hot and cold water to enter to the cartridge. A stationary sleeve with a cylindrical body is sized and placed inside the cartridge. The stationary sleeve has a plurality of first-apertures for hot water inlet, a plurality of second-apertures for tempered water outlet, and a plurality of third-apertures for cold water inlet. A movable shuttle is designed and placed inside the stationary sleeve, wherein the movable shuttle has a cylindrical-shuttle body with three annular portions and two conduits for hot and cold waters, wherein the two conduits are not connected to each other. Thereby, the hot water or cold water pressures inside the sleeve regulate the position of the movable shuttle.

5 Claims, 8 Drawing Sheets

VALVE HAVING A DIVERTING CARTRIDGE WITH INTEGRAL PRESSURE BALANCE

FIELD OF INVENTION

The present invention relates to a single lever diverting cartridge with an integral pressure balance device and a stop, as used in tub-showers, sinks and three-handle valves.

BACKGROUND OF THE INVENTION

Three-handle mixing valves are popular for their stylishness, trim elegance and ease of use. However, in their current design, all three handle valves do not meet current building codes as they cannot response to sudden changes in water pressure. This has resulted in a large number of injuries due to sudden exposure to a very hot or cold water. Consequently, the new building codes require all mixing valves, used in all types of tub shower installations, to be capable to respond to abrupt changes in hot or cold water pressures. Special types of fittings are needed to provide pressure balance between the hot and the cold flows. Thermostatic valves have also been used to restore the hot and the cold water flows to a temperature set prior time to an abrupt change. The presently disclosed diverter valve has a novel mechanism for adjusting the hot and cold flows, and can be used in a large variety of valves, including the three handle mixing tub shower fittings valves.

The maintenance and repair of the diverter valves for the three-handle mixing valves, as disclosed in the prior art, are cumbersome. It is desired for a three-handle mixing valve to have a single diverter cartridge that encompasses all the elements in one embodiment and with one structure. This simplifies maintenance and repair. In addition, the present diverter cartridge for three-handle mixing valve has a housing with a single cartridge that is easily removed for repair or replacement by an untrained user.

SUMMARY OF THE INVENTION

The presently disclosed valve uses a cartridge with an integral pressure balancing devise and a stop to automatically adjust for any water pressure fluctuations, in order to maintain a pre-set water temperature at its outlet.

The cartridge has a pair of hot and cold ports in communication with a hot and a cold-water way inlet of the valve body. The hot and cold inlet ports are in communication with the cartridge body, a stationary sleeve, and a movable shuttle within the stationary sleeve. The shuttle responds to any sudden changes of water pressure and controls and maintains a pre-set temperature. The water outlet temperature is adjusted by the main hot and the cold shut off valves located downstream of a diverter cartridge. The cartridge is equipped with a pressure balance device, which responds to a sudden change in the hot or cold water pressure in the stationary sleeve chamber.

Two identical hyperbolic O-rings are used to keep the rotating cartridge at the center of a valve-body at all times. The hyperbolic O-rings are used to seal (i) the spout port, (ii) the shower port, and (iii) serve as a stop.

The mixing valve assembly of the present invention, such as a three handle mixing valve, for tubs, spouts and shower heads, comprises of a housing, which has an opening to receive a cartridge. The housing has two inlets (one for the cold water and one for the hot water) and preferably two outlets (one for a shower head, one for the spout). The cartridge is a cylindrical body with a plurality of cold water inlet apertures, a plurality of hot water inlet apertures and an outlet aperture (preferably axially aligned) and in one embodiment. Hot and cold water inlet apertures of the cartridge are aligned with the inlets of the housing to allow the hot and cold water to enter into the cartridge.

The rotating cartridge valve has a stationary sleeve that has a cylindrical body. The cylindrical body of the stationary sleeve is divided into three regions. The stationary sleeve is sized and placed inside the rotating cartridge body opening. The first region has a plurality of apertures for the hot water inlet. The second region has a plurality of apertures for the cold-water inlet. The third region has a plurality of apertures for the exit of the tempered water. Four O-rings are sized and placed inside four grooves (recesses) outside of the body of the stationary sleeve.

In order to regulate the hot and the cold-water temperature, an especially designed movable shuttle is placed inside the sleeve. The movable shuttle has a cylindrical body with three identical annular sections and two depressed area on the outside, one for hot and one for the cold waters. Additionally, it has two chambers that are not in communication with each other. The hot water and the cold-water pressures inside each said chamber regulate the position of the movable shuttle. When the pressure of the hot water and the cold water are approximately even and the same, the position of the movable shuttle inside the sleeve is in the middle, so the annular section of the movable shuttle only covers half portion of the hot water and the cold water inlets of the sleeve. By changing the hot or cold water pressures, the position of the movable shuttle will change accordingly, obstructing the port with a higher pressure of hot or cold water.

It is an object of the present invention to provide a three handle tub shower mixing valve diverter cartridge with integral pressure balance device and a stop to be operated by a single handle for use in a tub, a spout and a shower head.

It is another object of this invention to provide a pressure balanced cartridge for three handle mixing valves, which can be easily dismantled and rebuilt without the removal of a screen or other complicated components and by simply using standard tools and skills.

Other objects, features, and advantages of the present invention will be readily appreciated from the following description. The description makes reference to the accompanying drawings, which are provided for illustration of the preferred embodiment. However, such embodiments do not represent the full scope of the invention.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

Figure 1:
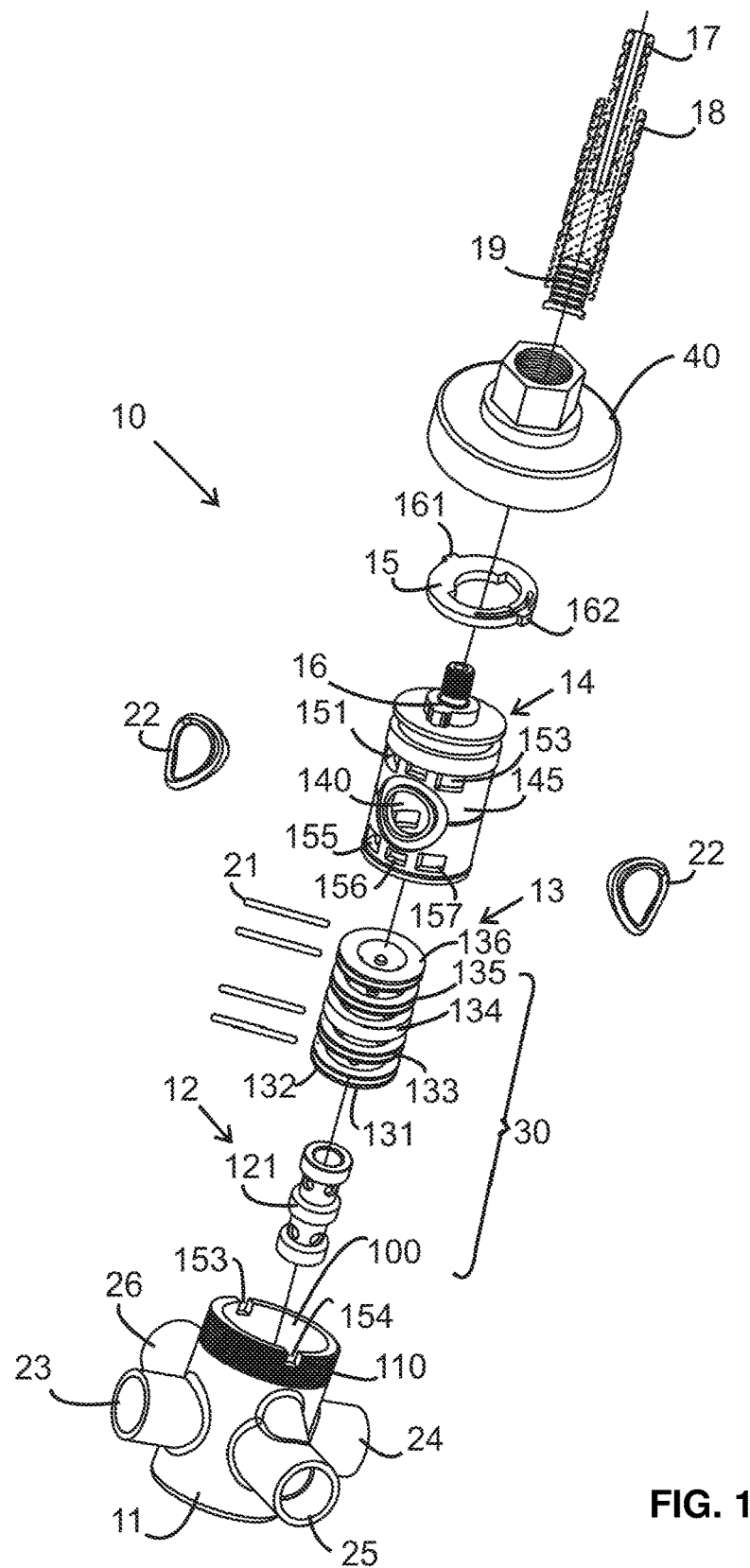
FIG. 1 is an explosive view of the valve components of the present invention.

The figures are not intended to be exhaustive or to limit the present invention to the precise form disclosed. It should be understood that the invention can be practiced with modifications and alterations, and that the disclosed invention be limited only by the claims and equivalents thereof.

DETAILED DESCRIPTION OF PREFERRED EMBODIMENTS

The invention disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIGS. 1-2, 3A, 3B, 3C, 4A, 4B, 4C and 4D illustrate a complete assembly for a valve having a diverting cartridge with integral pressure balance spool type and a stop for diverting valve 10. The single handle mixing valve assembly 10 of the present invention is ideal for tubs, spouts and shower heads. It comprises of a housing 11 having a valve-opening 100 to receive a cartridge 14. The housing 11 has two inlets 25, 26 (cold water inlet 25 and hot water inlet 26) and two outlets 23, 24 (shower 23 and spout 24). The cartridge 14 comprises of a cylindrical body 145 having a plurality of cold water inlet apertures 151-154, a plurality of hot water inlet apertures 155-158, and an outlet aperture 130 designed on the cylindrical body 15. Hot and cold water inlet apertures 151-154, 155-158 of the cartridge 14 are in alignment with the inlets 25, 26 of the housing 11 for allowing hot and cold water to enter into the cartridge 14.

As shown in FIGS. 1, 2, 6A and 6B, the valve has a stationary sleeve 13, which has a cylindrical body 131 with five annular portions 132-136. The cylindrical body 131 is divided into three regions R1-R3. The stationary sleeve 13 is sized and placed inside the cartridge. The first region R1 has a plurality of apertures 301-305 for hot water inlets into the sleeve opening 130; the second region R2 has a plurality of apertures 310-311 and 210-211 for tempered water outlet; and the third region R3 has a plurality of apertures 201-205 for cold water inlets into the sleeve opening 130. Four O-rings 21 are sized and placed inside four grooves (recesses) 141-144 in the cylindrical body 131 of the stationary sleeve.

As shown in FIGS. 1, 2, 7A, 7B and 7C, a movable shuttle 12 is placed inside the sleeve 13 to regulate the water pressure of hot and cold water inside the cartridge 14. The movable shuttle 12 has a cylindrical body 121 with three annular sections 122-124 and two chambers 125-126 and two depressed area 156-158 for hot and cold waters. These two chambers 125-126 are not in communication with each other. The hot water or the cold-water pressures inside the sleeve 13 regulate the position of the movable shuttle 12. In the normal pressure, when the pressure of the hot water and the cold water are approximately the same, the position of the movable shuttle 12 inside the sleeve 13 is in the middle, so the annular section 122 and 124 of the movable shuttle 12 only covers half portion of the hot water inlets 301-305 and the cold-water inlets 201-205 of the sleeve 13. By changing the hot and the cold water pressures, the position of the movable shuttle 12 will move to further obstruct the port with a higher pressure, thus adjusting the temperature by automatically adjusting the inlet flows of hot and cold waters 301-305 and 201-205.

Figure 7A:
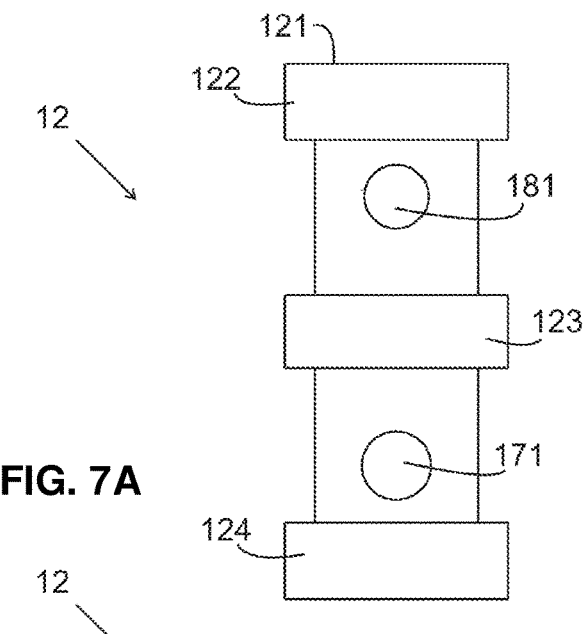
FIG. 7A shows a front view of the movable shuttle of the present invention.
Figure 7B:
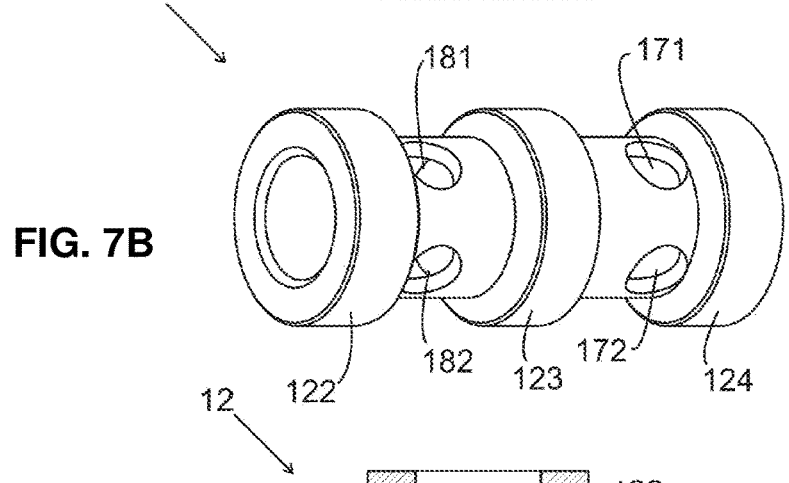
FIG. 7B shows a perspective view of the movable shuttle of the present invention.
Figure 7C:
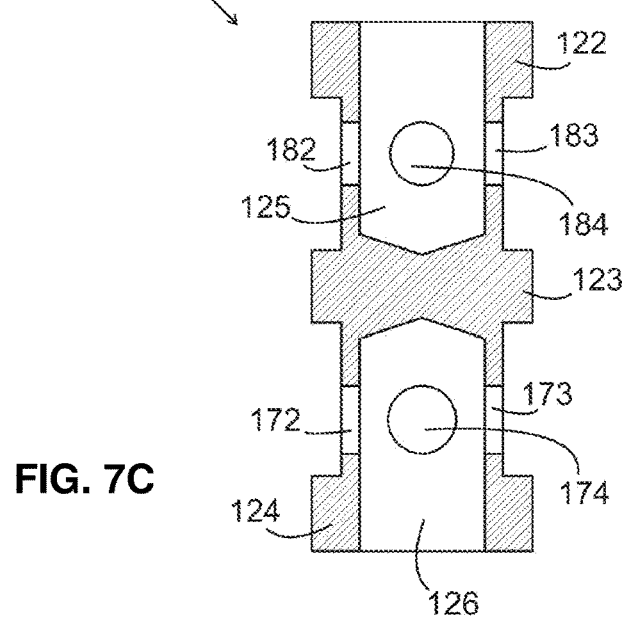
FIG. 7C shows a cross sectional view of the movable shuttle of the present invention.

Again as shown in FIGS. 7A, 7B and 7C, the hot water enters into the stationary sleeve 131 through ports 301-305, it then flows into the hot water chamber of the shuttle 126, terminating inside the sleeve chamber 130 in the second region R2, through a plurality of hot water outlet apertures 171-174. Similarly the cold water enter the stationary sleeve 131 through cold-water inlets 201-205, and into the cold-water chamber of the shuttle 125, and then enters into the sleeve chamber 130 in the third region R3 through a plurality of cold water outlet apertures 181-184. The cold water enters the depressed area 156 and the hot enters the depressed area 158, where the water then mixes inside the sleeve opening 130. The tempered water is navigated to a set of tempered water outlets 210-211 and 310-311.

Figure 2:
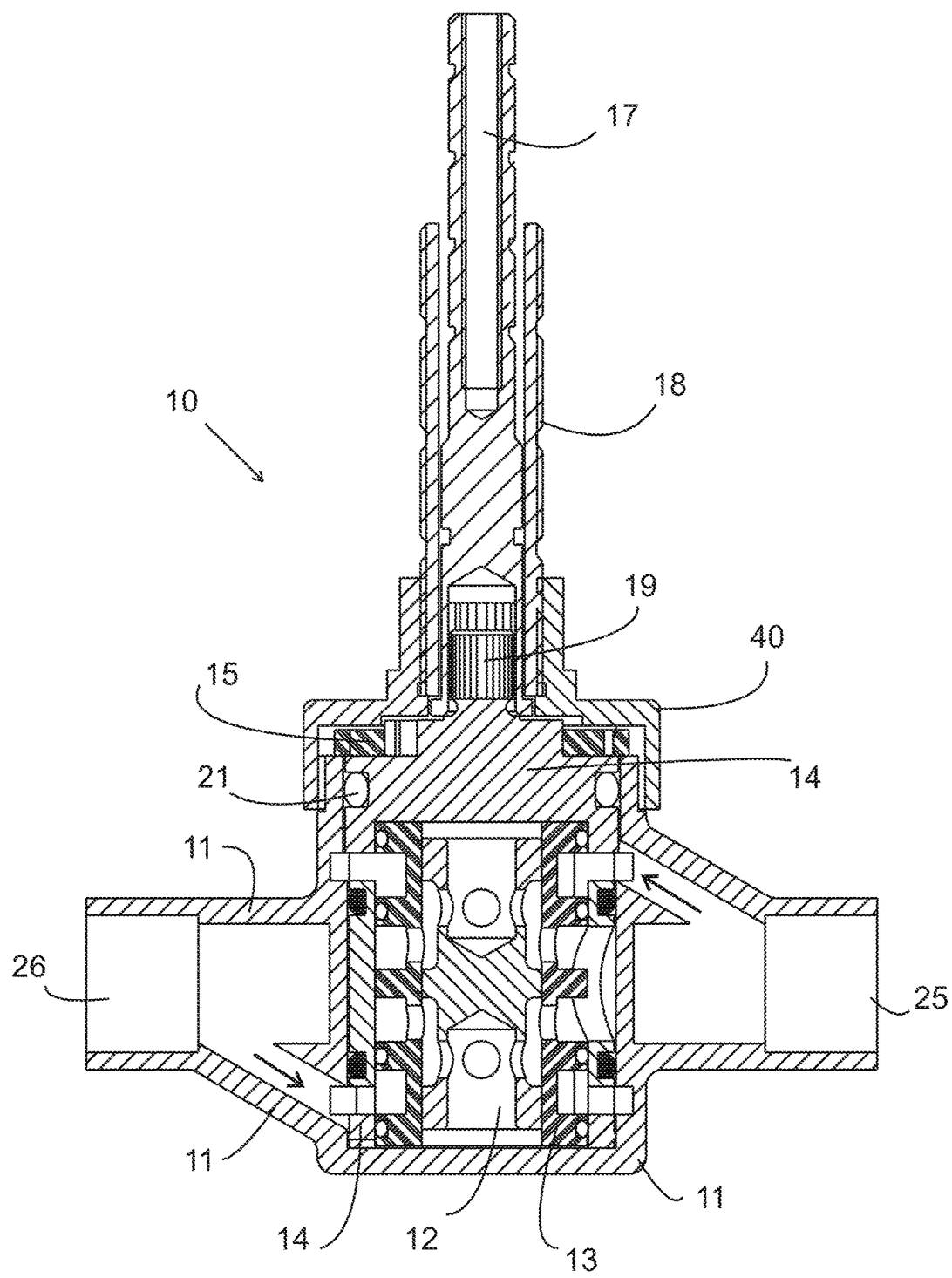
FIG. 2 shows the valve components of the present invention.

Again as shown in FIG. 2, the valve 10 has a body portion 11 to receive a cartridge 14 with an integral pressure balance mechanism, which is inserted inside the cartridge cavity 140 to control the pressure and flow of the water.

Again as shown in FIGS. 1-2, the three-handle diverting valve 10 further comprises of a detent washer 15 to rotate the cartridge 14, a spline cartridge 19, a spline 17, a sleeve trim 18, a cartridge O-rings 21, sleeve O-rings 23, and hyperbolic O-rings 22. A detent cartridge tooth 16 engages with the detent washer 15, to navigate the rotation of the cartridge 14.

Again as shown in FIGS. 1-2, the cartridge 14 has the cartridge cavity 140 to receive the sleeve 13, and the sleeve 13 has the sleeve opening 130 to receive a shuttle 12. By placing the cartridge 14 with its components 12-13 inside the valve-opening 100, the detent washer 15 is placed on the top of the cartridge 14 to guide and to be engaged with the detent cartridge tooth 16 in turning the cartridge 14 on to a selected mode inside the body 11.

Again as shown in FIGS. 1-2, the outer surface of the body 11 has threaded portion 110 to be engaged with the trim nut 40. The cartridge 14 is centrally aligned inside the valve-opening 100 with the help of two hyperbolic O-rings 22 and the detent washer 15 having two teeth 161-162, which are engaged with two cut-outs 153-154. The sleeve 13 is centrally aligned inside the cartridge cavity 140 with help of four sleeve O-rings 23, wherein the sleeve O-rings 23 seal the sleeve regions R1-R3.

Figure 3A:
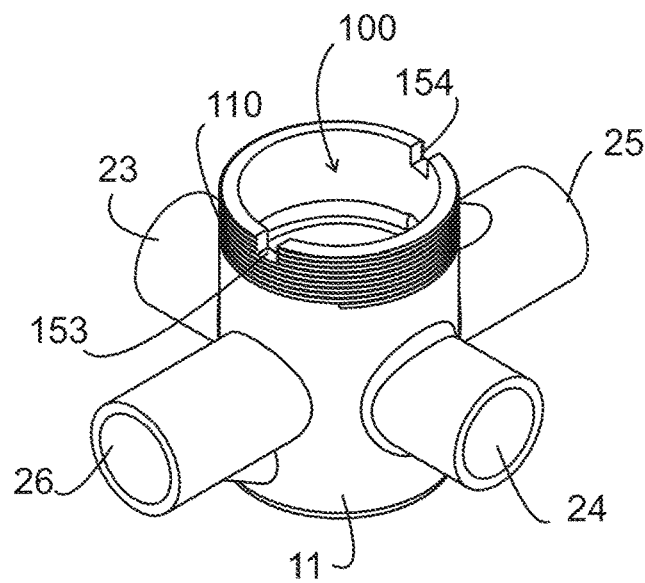
FIG. 3A shows a perspective view of the valve housing of the present invention.
Figure 3B:
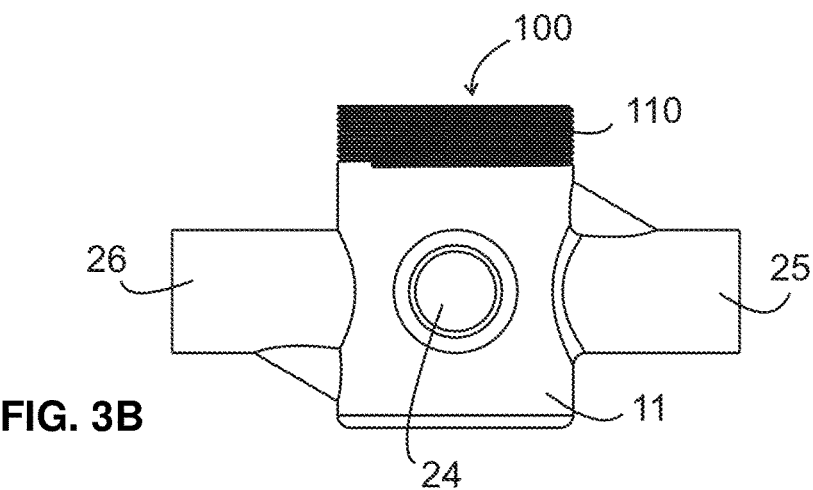
FIG. 3B shows a side view of the valve housing of the present invention.
Figure 3C:
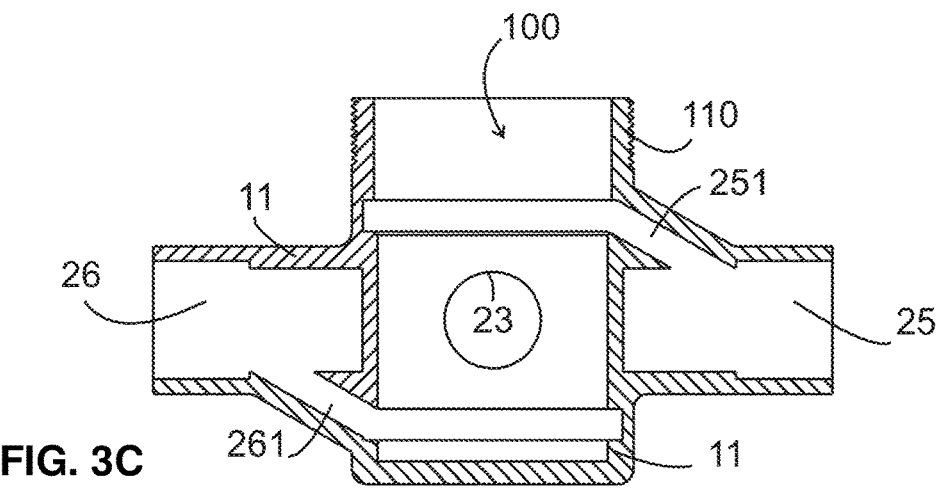
FIG. 3C shows a cross sectional view of the housing and water ways of the present invention.
Figure 4A:
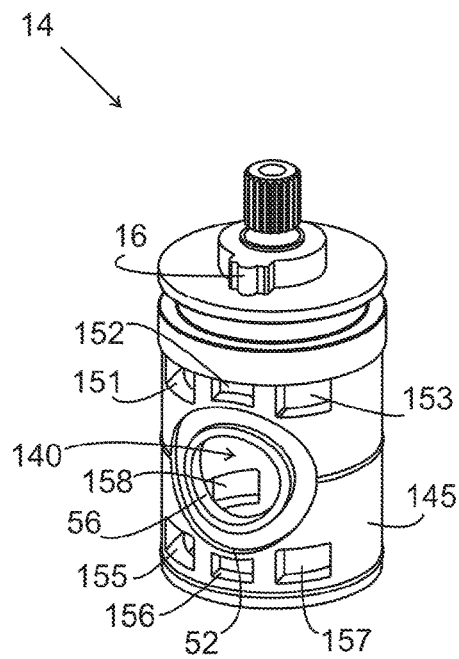
FIG. 4A shows a perspective view of the rotatable cartridge of the present invention.
Figure 4B:
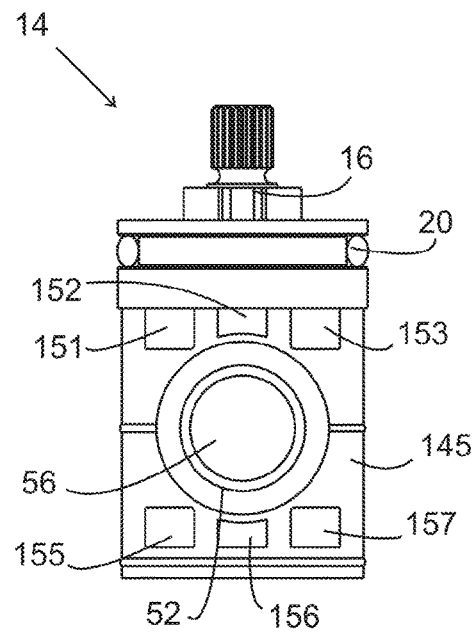
FIG. 4B shows the front view of the rotatable cartridge of the present invention.
Figure 4C:
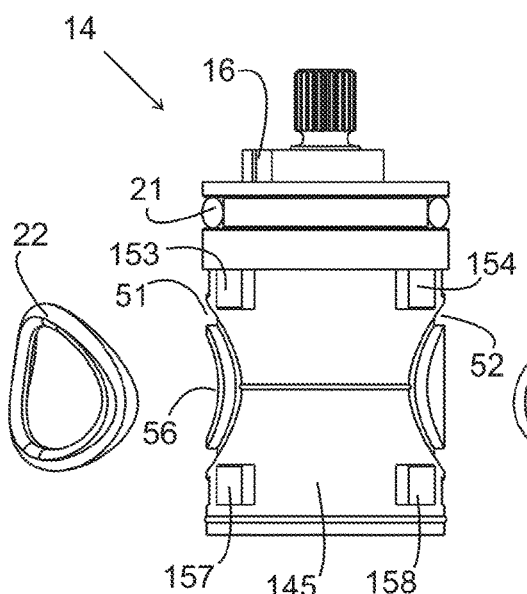
FIG. 4C shows a lateral view of the rotatable cartridge of the present invention.
Figure 4D:
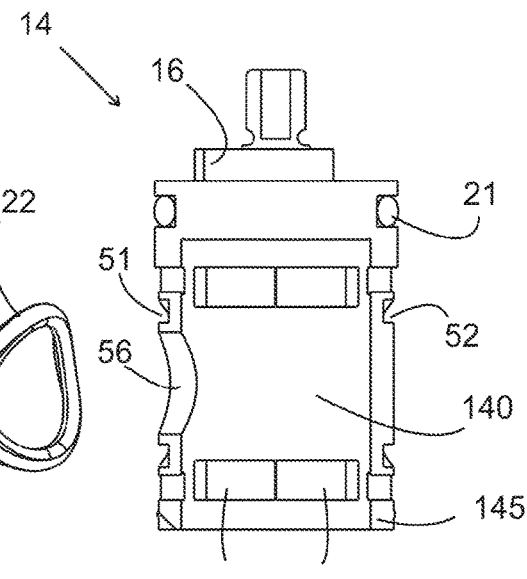
FIG. 4D shows a cross sectional view of the rotatable cartridge of the present invention.

According to FIGS. 3A, 3B and 3C the housing 11 comprises of a hot water inlet 25, a cold water inlet 26, an outlet shower 23, and a spout outlet 24, which are disposed on a substantially identical horizontal plane, but at 90 degree to one another.

Figure 6A:
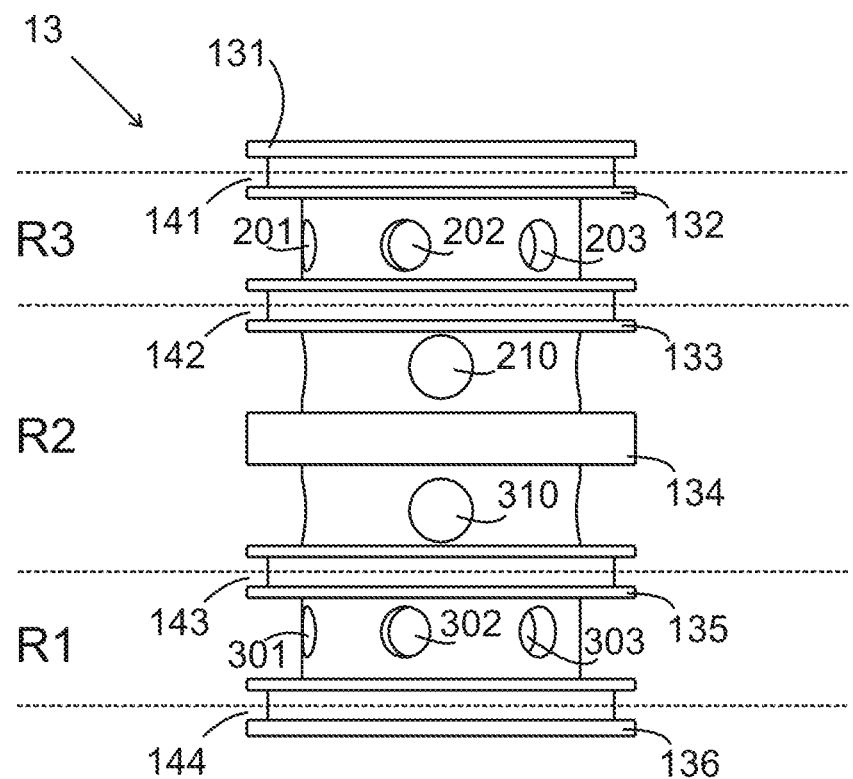
FIG. 6A shows a side view of the stationary sleeve of the present invention.
Figure 6B:
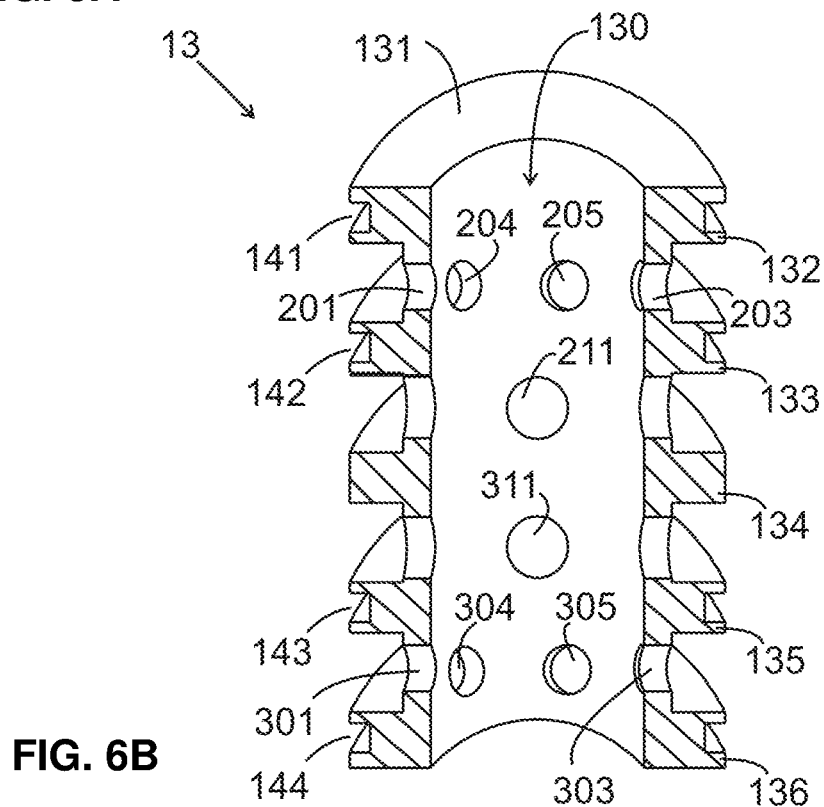
FIG. 6B shows a cross sectional view of the stationary sleeve of the present invention.

The hot and cold water inlets 25 and 26, therefore are utilized to allow hot and cold water into the valve-opening 100. The outlets 23 and 24 are provided to allow for the passage of mixed hot and cold water (tempered water). Again as shown in FIGS. 3C, 6A and 6B, the hot and cold water are introduced into the valve-opening 100 through two passageways 251, 261. The hot passageway 251 navigates hot water into the hot water inlet apertures 155-158 in the cartridge 14. The cold passageway 261 navigates cold water into the cold water inlet apertures 151-154 in the cartridge 14.

FIGS. 4A, 4B, 4C and 4D show a perspective view, a front view, a lateral view and a cross sectional view of the rotatable cartridge 14, respectively. The rotatable cartridge 14 comprises of two hyperbolic depressions 51, 52 to receive two hyperbolic O-rings 22 and a cartridge opening 56. The rotatable cartridge 14 is aligned inside the valve-opening 100 by the help of two hyperbolic O-rings 22, which are sized and placed in the cartridge body. For the sealing purposes and for the alignment of the cartridge inside the valve-opening 100, two hyperbolic O-rings 22 are designed in the cartridge body 14. Two hyperbolic O-rings 22 with their special design help the cartridge 14 to be centered in the valve-opening 100.

Figure 5A:
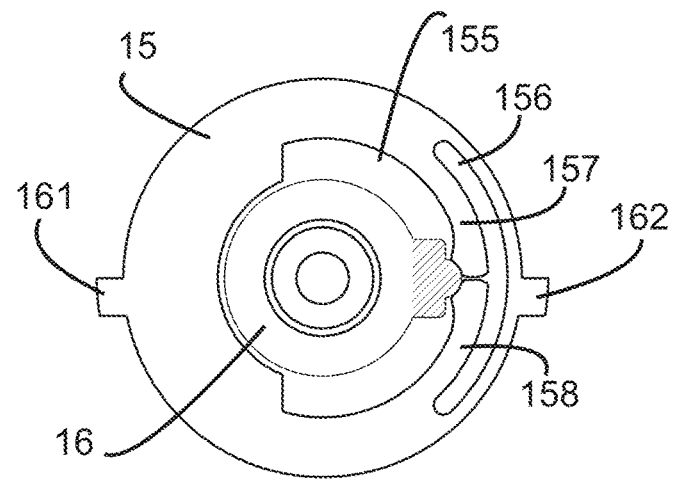
FIG. 5A shows a top view of the detent washer of the cartridge in a close (stop) mode position.
Figure 5B:
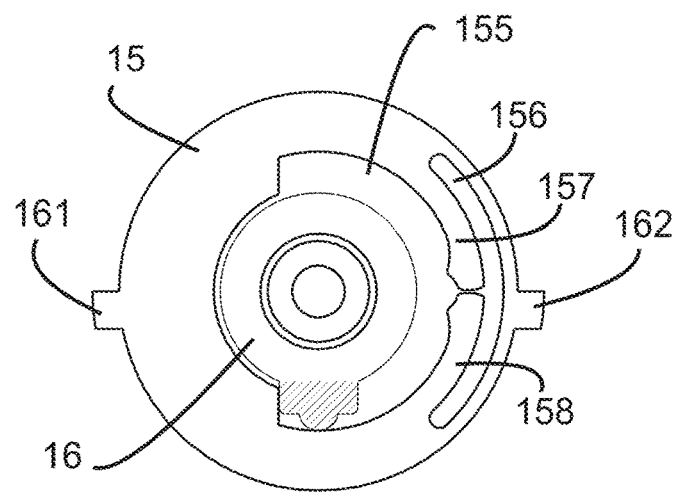
FIG. 5B shows a top view of the detent washer of the cartridge in a spout mode position.
Figure 5C:
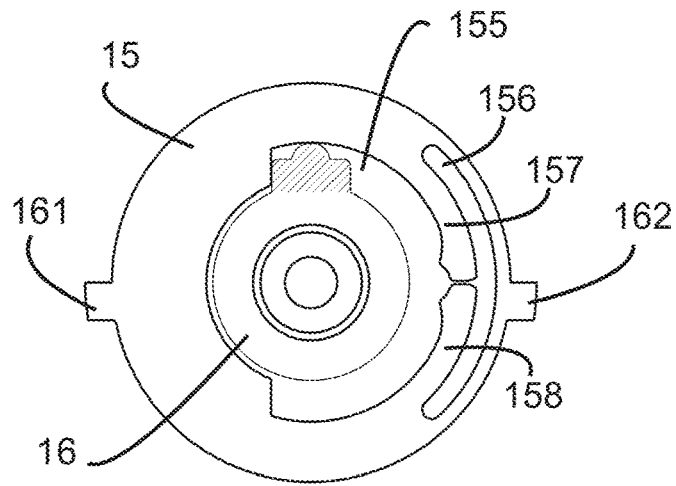
FIG. 5C shows a top view of the detent washer of the cartridge in a shower mode position.

FIGS. 5A, 5B and 5C show the detent washer 15 of the rotatable cartridge in three distinct positions regarding to detent cartridge tooth 16. The detent washer 15 has two teeth (wings) 161-162 on its outer perimeter, a central opening 155. The central opening 155 is shaped to engage with the cartridge tooth 16. The detent washer 15 also has a slot opening forming 156 to form two ribs 157-158, which act as a detent spring. The tip of the ribs is configured to engage with the detent cartridge tooth 16 for precise positioning. FIG. 5A shows the detent washer 15 in the closed mode, FIG. 5B shows the detent washer 15 in the spout mode and FIG. 5C shows the detent washer 15 in the shower mode.

FIGS. 6A and 6B show a lateral view and a cross sectional view of the sleeve 13 of the present invention. The sleeve 13 is located inside the cartridge cavity 140 and is aligned at the center of the cartridge using several O-rings set in recesses 141-144. A plurality of apertures 210-211 and 310-311 in the body of the sleeve 131 are designed to guide the tempered water to the cartridge opening 56.

Again as shown in FIGS. 6A, 6B, 8A, 8B and 8C, the plurality of apertures 301-305 for the hot water inlets and the plurality of apertures 201-205 for the cold water inlets, respectively, are designed to receive hot and cold water into the sleeve opening 130. Inside the sleeve opening 130, there is a movable shuttle 12, which restricts the water flow of apertures 201-205, 301-305 by about 50% of the hot and cold water. The shuttle 12 is sensitive to any change in the water pressure and equally restricts the hot and cold water flow to maintain a preset temperature at all times.

FIGS. 7A, 7B, 7C, show a front view, a perspective view and a cross sectional view of the movable shuttle 12 of the present invention, respectively. The movable shuttle 12 is located in the center of the sleeve 13 to regulate the water flow, water pressure and water temperature. The movable shuttle 12 has a cylindrical body 121 with three annular portions 122-124 and two conduits 125-126 for hot and cold waters. These two conduits 125-126 are not connected to each other. The hot water or the cold water pressures inside the sleeve 13 regulate the position of the movable shuttle 12.

Figure 8A:
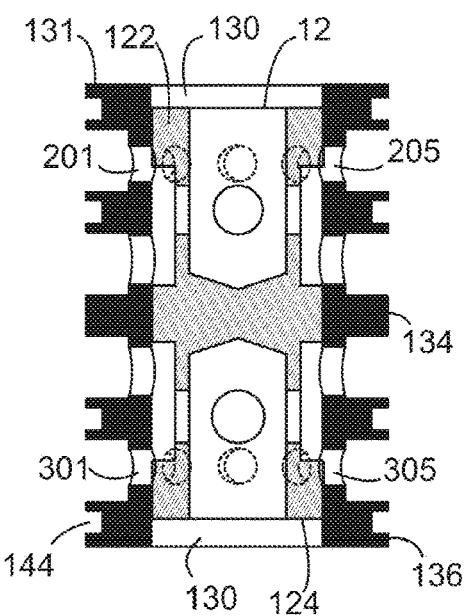
FIG. 8A shows the movable shuttle inside the stationary sleeve in normal position.
Figure 8B:
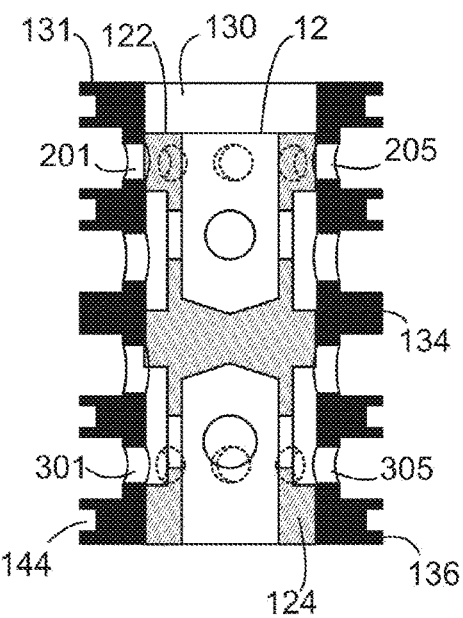
FIG. 8B shows the movable shuttle inside the stationary sleeve in shut off position of the cold-water inlets.
Figure 8C:
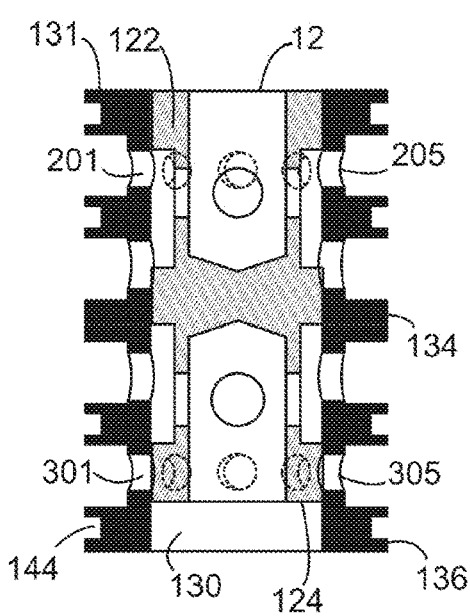
FIG. 8C shows the movable shuttle inside the stationary sleeve in shut off position of the hot water inlets.

Again as shown in FIGS. 8A, 8B and 8C, in the normal pressure, as shown in FIG. 8A, when the pressure of the hot water and the cold water are approximately the same, the position of the movable shuttle 12 inside the sleeve 13 is at the middle. Therefore, the annular portions 122 and 124 of the movable shuttle 12 only cover half portion of the hot water inlets 301-305 and cold water inlets 201-205 of the sleeve 13. By changes in the hot and cold water pressures, the position of the movable shuttle 12 is changed to obstruct the hot and cold water inlets 301-305 and 201-205. FIG. 8B shows the sleeve 13 and the movable shuttle 12 of the present invention, when the cold water inlets 201-205 are fully closed due to high pressure in the cold water. FIG. 8C shows the sleeve 13 and the movable shuttle 12 of the present invention, when the hot water inlets 301-305 are fully closed due to high pressure in the hot water.

By opening the main valve control of the present invention, the hot and cold water will mix in the cartridge body. The ratio of the hot and cold water can be adjusted by turning the main control valve. For preventing the flow of the hot water or the cold water to the outlet, the shuttle and the sleeve of the present invention regulate the hot and cold water in the valve. If only the hot water or the cold water is opened, then no water will flow from any of the outlets. The high pressure in the hot or the cold water separately moves the shuttle in the cartridge and closes the port with a higher pressure and opens the port with a lower pressure. The water pressure is restored when the shuttle equalizes the water temperature to its original setting. Movement of the shuttle inside the sleeve controls the pressure of the hot and the cold water, therefore the temperature can be kept at a pre-set temperature at all times.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A valve having a diverting cartridge with an integral pressure balance comprising of:
   a) a housing having an opening to receive a cartridge, wherein said housing has a cold water inlet, a hot water inlet, and a shower outlet and a spout outlet and wherein said cold water inlet, said hot water inlet, said shower outlet and said spout outlet are disposed on a substantially identical horizontal plane, but at 90 degree to one another;
   b) said cartridge comprises of a cylindrical body having a plurality of cold water inlet apertures, a plurality of hot water inlet apertures and an outlet aperture on said cylindrical body; wherein said hot and cold water inlet apertures are aligned with said hot and cold water inlets to allow a hot and a cold water to enter said cartridge;

c) a stationary sleeve with a cylindrical-sleeve-body, wherein said stationary sleeve is sized and placed inside said cartridge, wherein said stationary sleeve has a plurality of first-inlet-apertures for the hot water, a plurality of second-inlet-apertures for the cold water, and a plurality of third-outlet-apertures for a tempered water;

d) a movable shuttle placed inside said stationary sleeve, wherein said movable shuttle has a cylindrical-shuttle body with two longitudinally extended depressed areas on said cylindrical-shuttle body and upper and lower longitudinally extended annular chambers, wherein said upper and lower chambers are decoupled; and whereby the hot water or cold water pressures inside the sleeve is regulated by the position of said movable shuttle, whereby the pressures in the hot or the cold water move the movable shuttle in the cartridge and closes the first-inlet-apertures or the second-inlet-apertures with a higher pressure and opens the second-inlet-apertures or the first-inlet-apertures with a lower pressure and whereby said movable shuttle is located in the middle of said stationary sleeve when the hot and cold water pressures are approximately the same.

2. The valve having a diverting cartridge of claim 1, wherein said cartridge further having two hyperbolic depressions sealed with two hyperbolic O-rings which are centrally aligned said cartridge inside said opening.

3. The valve having a diverting cartridge of claim 1, wherein said opening further has a hot passageway and a cold passageway, wherein said hot passageway navigates hot water into said hot water inlet apertures and said cold passageway navigates cold water into said cold water inlet apertures.

4. The valve having a diverting cartridge of claim 3, wherein said hot passageway and said cold passageway are annular in said housing.

5. The valve having a diverting cartridge of claim 3, wherein said hot passageway is located in a lower portion of said housing and said cold passageway is located in an upper portion of said housing.

* * * * *